United States Patent Office.

GEORGE A. LOVELL, OF ORANGE, ASSIGNOR OF ONE-HALF TO ALBERT A. LOVELL, OF WORCESTER, MASSACHUSETTS.

METHOD OF AND MEANS FOR PREPARING AND HARDENING PAPER-BOARD FOR JAPANNING AND ENAMELING PURPOSES.

SPECIFICATION forming part of Letters Patent No. 270,820, dated January 16, 1883.

Application filed August 9, 1882. (No specimens.)

*To all whom it may concern:*

Be it known that I, GEORGE A. LOVELL, of Orange, in the county of Franklin and State of Massachusetts, have invented certain new and useful Improvements in the Method of and Means for Preparing and Hardening Paper-Board for Japanning and Enameling Purposes; and I declare the following to be a description of my said invention sufficiently full, clear, and exact to enable others skilled in the art to which it appertains to make and use the same.

The object of my present invention is to provide a method or means whereby sheets of paper-board or articles made therefrom can be so prepared and hardened that they may be practically and successfully japanned or enameled without warping, twisting, or bulging out of shape when the japan is applied to them, or when subjected to the degree of heat necessary for baking the japan or enameled coating.

My invention is applicable to the ordinary kinds of paper or paper-board material, variously known as "pasteboard," "mill-board," "book-board," "tar-board," "straw-board," "leather-board," &c., either in the form of plain sheets, or of various articles manufactured or cut therefrom.

In my improved method the paper-board or article formed therefrom is treated with an anti-warping or hardening preparation, applied thereto previous to the application of the japan or enamel, which preparation penetrates and acts on the substance of the paper-board, filling and hardening it in such manner that it is rendered solid and firm, and is prevented from becoming warped or twisted when subjected to moisture, or to the action of the heat necessary for baking the japan. The preparation which I employ for this purpose is composed of the following-named ingredients or their equivalents, in about the proportions specified, viz: of shellac, cut with alcohol, one part; linseed-oil or similar drying-oil, either boiled or raw, one part; chloride of zinc, (in dry powder,) about one ounce to the gallon, more or less. The proportions may be somewhat varied for different kinds of paper-board. The preparation composed of these several ingredients thoroughly mixed together may be applied to the paper-board by the aid of a brush, or by immersing the paper-board or article in a bath of the liquid, which is allowed to freely penetrate the substance of the board and to cover the surface thereof. The paper-board is then allowed to dry until the preparation becomes comparatively hard and solid. The drying may be hastened by artificial means, or by placing the board or articles in an oven or other suitable drying apparatus. When dry the surface of the paper-board may be smoothed off with sand-paper or pumice-stone, and the japan or enamel can be then applied and baked on in the same manner as it is ordinarily applied to articles formed of metal, the preparation forming a hard, smooth foundation for the japan, while it also strengthens and hardens the substance of the paper. The paper-board or articles formed therefrom when treated with the hardening or anti-warping preparation, and subsequently japanned, will remain fixed in shape, or will retain the original form and proportions, and will not warp, twist, or shrink out of shape by the action of the high degree of heat to which they are subjected when baking the japan or enamel, or by the action of moisture or change of climate.

Other advantages incident to my invention are the increase of strength imparted to the paper-board by the treatment; the hard, smooth surface for the finish; the accuracy of the work that can be attained, and the reduced cost and labor required for producing fine-finished work.

What I claim as of my invention, and desire to secure by Letters Patent, is—

1. The process of hardening paper-board and similar substances which consists in saturating or coating the same with a preparation or compound composed of shellac, linseed-oil, and chloride of zinc, substantially as and for the purpose hereinbefore set forth.

2. The method of finishing articles made from mill-board, paper-board, or similar substance which consists in filling or coating said articles with a compound of shellac, oil, and chloride of zinc, smoothing off the surface thereby formed, and then japanning or enameling and ornamenting the same, substantially as hereinbefore described.

Witness my hand this 3d day of August, A. D. 1882.

GEORGE A. LOVELL.

Witnesses:
 WALDO R. FORRESTER,
 GEORGE BROWN.